United States Patent Office 2,759,913
Patented Aug. 21, 1956

2,759,913

COPOLYMERS OF COMPOUNDS CONTAINING ACTIVATED ETHYLENE DOUBLE BONDS WITH ACTIVE HYDROGEN COMPOUNDS

George E. Hulse, Newark, Del., assignor to Hercules Powder Company, Wilmington, Del., a corporation of Delaware No Drawing. Application May 20, 1952,
Serial No. 289,015

2 Claims. (Cl. 260—89.7)

This invention relates to new polymeric materials and their preparation and, more particularly, to the polymerization of an organic compound containing at least two activated ethylene double bonds with a compound containing at least two active hydrogens.

It is well-known that compounds containing ethylene double bonds may be self-polymerized or may be copolymerized with other ethylenically unsaturated compounds. Such polymerization reactions take place, in general, by means of a free radical mechanism and are usually catalyzed by the addition of a free radical initiator such as a peroxide catalyst, etc.

Now, in accordance with this invention, it has been found that organic compounds containing at least two ethylene double bonds, which have in the α-position to each double bond a carbonyl group of an aldehyde, ketone, acid, ester, or amide group, may be copolymerized with compounds which are characterized by containing at least two active hydrogens. These copolymers are prepared by polymerizing a mixture of the two monomers in the presence of a basic catalyst. Any compound containing at least two of such activated double bonds as for example, such compounds as ethylene diacrylate, methylenebis(acrylamide), polyethylene maleate, etc., may be copolymerized with any compound containing two active hydrogens in the presence of a basic catalyst. When the active hydrogen-containing compound is an amine, it may serve as the basic catalyst and no other catalyst need be added. If the active hydrogen compound which is copolymerized with the activated diethylenic compound is difunctional as in the case of a primary amine, the polymer is a linear polyamine. Cross-linked polymers are obtained when the active hydrogen compound is trifunctional as in the case of ammonia, or when it is tetrafunctional as in the case of a diamine such as ethylenediamine, etc.

The following examples will illustrated the preparation of the copolymers of compounds containing at least two activated ethylene double bonds with compounds containing at least two active hydrogens in accordance with this invention. All parts and percentages are by weight unless otherwise indicated.

Example 1

Ethanolamine, 30.5 parts, was added dropwise to an equimolar portion of ethylene diacrylate (85.0 parts) which contained 0.1% hydroquinone. The temperature of the reaction mixture was held at room temperature during this addition. The product which was obtained after the reatcion mixture was allowed to stand for 24 hours at room temperature was a barely pourable oil which was soluble in water, gave a faintly cloudy solution in methanol, and was insoluble or only partly soluble in benzene, dioxane, and aretone. A 2% solution of this product in water had a specific viscosity of 0.076.

Example 2

To a solution of 17.0 parts of ethylene diacrylate in 17 parts of t-butyl alcohol was added 6.1 parts of ethanolamine at such a rate that the temperature did not exceed 25° C. during the addition. An additional amount of t-butyl alcohol (6 parts) was added to the reaction mixture and the temperature was raised to 70° C. and held at that point for 9 days. The solvent was then removed by distillation in vacuo whereby a golden yellow oil was obtained as the product. A 1% solution of this oil in water had a specific viscosity of 0.049.

Example 3

Example 2 was repeated except that 7.3 parts of n-butylamine was substituted for the ethanolamine used in that example. The polymer was a deep red oil. It was not completely soluble in water but gave a clear solution in 2% acetic acid. A 1% solution of the polymer in 2% acetic acid had a specific viscosity of 0.045.

Example 4

A solution of 4 parts of bis(2-mercaptoethyl)sulfide and 0.03 part of hydroquinone in 10 parts of dimethylformamide) was added to a solution of 4.03 parts of methylenebis(acrylamide) in 10 parts of dimethylformamide. To this mixture of monomers was then added 0.1 part of a 25% solution of trimethylbenzylammonium hydroxide in methanol, whereby an exothermic reaction took place. A white precipitate was formed within a few minutes. To insure that a complete reaction had taken place, the reaction mixture was then heated for 16 hours on a steam bath. The precipitate was separated by filtration and then was extracted with boiling 95% ethyl alcohol, and finally was dried in a vacuum oven. It had a melting point of about 260° C. and was soluble in boiling ethylene glycol and boiling m-cresol, but was insoluble in other solvents. It contained 31% sulfur, indicating that it was a 1:1 polymer (theory for 1:1 polymer is 31.4% sulfur).

Example 5

A solution of 4.0 parts of bis(2-mercaptoethyl)sulfide in 56 parts of t-butyl alcohol and a solution of 0.05 part of sodium in 10 parts of t-butyl alcohol were added to a solution of 4.42 parts of ethylene diacrylate (containing 0.1% hydroquinone) in 16 parts of t-butyl alcohol. The reaction mixture was allowed to stand for 2 days at room temperature and then was heated at 100° C. for 1 day. The precipitate so formed was removed by filtration, extracted with 95% ethyl alcohol, and then dried in vacuo at 60° C. It contained 28% sulfur, the theoretical sulfur content for a 1:1 polymer being 29.6%.

Example 6

Benzylamine, 5.35 parts, was added to 8.50 parts of ethylene diacrylate. The resulting viscous solution was then heated at 70° C. for 24 hours. The viscous product so obtained was insoluble in water but dissolved very slowly in 2% acetic acid. A 1% solution of this polymer in 2% acetic acid had a specific viscosity of 0.044.

Example 7

Ethylenediamine, 7.2 parts, was added to 30.6 parts of ethylene diacrylate. The reaction was highly exothermic and a rubbery gel was immediately formed.

By repeating this polymerization in the presence of a solvent, it was possible to produce solutions from which films could be cast. A solution of 30.6 parts of ethylene diacrylate in an equal amount of t-butyl alcohol was mixed with a solution of 4.3 parts of ethylenediamine in an equal amount of t-butyl alcohol. As before, the reaction was exothermic. A film was cast just before the gel point and was tack-free after heating for 2 hours at 70° C. The same results were obtained when dimethylformamide was substituted as the solvent.

Example 8

A solution of ammonia in t-butyl alcohol, 23.63 parts containing 0.87 part of ammonia, was chilled in ice. To this solution was then slowly added 13.05 parts of ethylene diacrylate. The cloudy solution which formed was allowed to stand for 16 hours at room temperature, whereupon an oil precipitated. The mixture was then heated in a closed container at 70° C. for 6 hours, at the end of which time a gel had formed. The gel was insoluble in water but swelled on acidification. It was also insoluble in methanol and benzene.

Example 9

Ternary polymers were formed by the addition of mixtures of ethylenediamine and ethanolamine, in varying proportions, to a solution of ethylene diacrylate in dimethylformamide, the temperature being held at room temperature during the addition. The amounts of each monomer in each of the reaction mixtures are tabulated below:

|   | Parts of Ethylene Diacrylate | Parts of Ethylenediamine | Parts of Ethanolamine |
|---|---|---|---|
| A | 3.4 | 0.36 | 0.30 |
| B | 3.4 | 0.24 | 0.61 |
| C | 3.4 | 0.12 | 0.91 |

Films of the polymer solution formed in each case were cast on glass plates and dried at 70° C. All of the films were tack-free and insoluble in water. After standing at room temperature for 60 hours, the solution identified as A in the above table had gelled.

Example 10

Example 9 was repeated except that an equimolar quantity of benzylamine was substituted for the ethanolamine used in the above three reaction mixtures and in each case the reaction mixtures could be cast on glass and films obtained.

Example 11

A mixture of 1.0 part of methylenebis(acrylamide), 0.55 part of piperazine, and 2 parts of water was agitated until it became homogeneous, the temperature rising to 45° C. due to the heat of reaction. The reaction mixture was then allowed to stand overnight at 25° C., after which it was poured into 20 parts of hot 95% ethanol. This mixture was cooled to 0° C. and the polymer which separated was removed by filtration. It was a colorless solid melting at 255° C. (with decomposition) and contained 21.9% nitrogen (calculated nitrogen content for a 1:1 polymer is 23.3%). A 1% solution of it in 2% acetic acid had a specific viscosity of 3.81.

Example 12

A solution of 0.02 part of sodium in 1.47 parts of molten Bisphenol (p,p'-isopropylidenediphenol) was cooled and 1.0 part of methylenebis(acrylamide) in 5 parts of dimethylformamide was added to it. The reaction mixture was heated at 140° C. for 12 hours, after which the dimethylformamide was removed by distillation in vacuo and the residue was then poured into acetone. The polymer was removed by filtration, triturated with water, and dried in vacuo at 80° C. A 1% solution of the tan, glassy solid polymer in dimethylformamide had a specific viscosity of 0.075.

Example 13

A mixture of 3.0 parts of ethylene diacrylate (containing 0.2% of phenyl β-naphthylamine), 1.32 parts of nitroethane, and 0.1 part of a 25% solution trimethylbenzylammonium hydroxide was heated at 100° C. for 48 hours. The reaction mixture was cooled and dissolved in 4 parts of acetone. This solution was then poured into 15 parts 95% ethanol which had been acidified with acetic acid, whereupon a highly viscous mass separated. The ethanol was decanted and the viscous mass was dried in a vacuum oven at 60° C. It contained 5.45% nitrogen as compared with 5.71% calculated for a 1:1 polymer. A 1% solution of the polymer in acetone had a specific viscosity of 0.061.

Example 14

To a solution of 0.05 part of sodium in 2.43 parts of diethyl malonate was added a mixture of 2 parts of methylenebis(acrylamide) and 0.02 part of phenyl β-naphthylamine. The mixture was agitated at 100° C. until it became homogeneous and then was heated for 48 hours at that temperature. The reaction mixture was extracted with hot water, then was dissolved in acetone and the resulting solution was poured into ether. The supernatant liquid was decanted from the highly viscous mass which had separated and the latter was dried in vacuo at 60° C. The dried polymeric material contained 8.6% nitrogen (calculated for a 1:1 polymer 8.9%). A 1% solution of the polymer in acetone had a specific viscosity of 0.045.

Example 15

A mixture of 2.0 parts of methylenebis(acrylamide), 0.94 part of butylamine, 0.01 part of phenyl β-naphthylamine, and 5 parts of water was agitated at 45° C. until it became homogeneous. The reaction mixture was then cooled to room temperature and held at that temperature for 4 days, after which it was triturated with hot water. The amorphous, white solid so obtained was soluble in 95% ethanol and 2% acetic acid, but was insoluble in water. It contained 18.1% nitrogen (calculated for a 1:1 polymer 18.5%). A 1% solution of the polymer in dimethylformamide had a specific viscosity of 0.145.

Example 16

A solution of 0.1 part of sodium in 7 parts of t-butyl alcohol was added to a mixture of 11.1 parts of ethylene diacrylate (containing 0.1% hydroquinone) and 10 parts of nitrilotripropionamide. The t-butyl alcohol was removed by distillation in vacuo and the reaction mixture was then heated to 190° C., solidification taking place after 1 hour at this temperature. It was then cooled and extracted with boiling water for several hours. The insoluble, infusible solid polymer which remained contained 7.7% nitrogen (calculated for a 1:1 polymer 10.5%).

Example 17

A mixture of 3.0 parts of ethylene diacrylate (containing 0.2% phenyl β-naphthylamine), 2.12 parts of acetophenone, and 0.05 part of sodium was heated at 100° C. for 48 hours. The reaction mixture was then extracted by triturating with boiling 95% ethanol. The insoluble, infusible polymer so obtained had a saponification number of 456 (calculated for a 1:1 polymer 448).

Example 18

A mixture of 3.0 parts of methylenebis(acrylamide), 1.45 parts of nitroethane, 0.1 part of a 25% solution of trimethylbenzylammonium hydroxide in methanol, 0.02 part of phenyl β-napthylamine, and 4 parts of quinoline was agitated at 100° C. until homogeneous and then heated for 48 hours at that temperature. The reaction mixture was then cooled to room temperature and dissolved in 95% ethanol. The resultant solution was poured into acetone, whereupon the polymer precipitated. It was a tan solid material and contained 16.8% nitrogen (calculated for a 1:1 polymer 18.3%). A 1% solution of this polymer in dimethylformamide had a specific viscosity of 0.256.

Example 19

Sodium (0.05 part) was dissolved in 2.52 parts of ethyl acetoacetate and the solution was added to a mixture of 3.0 parts of methylenebis(acrylamide) and 0.02 part of phenyl β-naphthylamine. The reaction mixture was agitated at 100° C. until homogeneous and then was heated for 16 hours at that temperature. It was then extracted with boiling water, after which it was dissolved in boiling acetone and the resultant solution poured into ether, whereupon the polymer precipitated. A 1% solution of the light brown solid polymer in dimethylformamide had a specific viscosity of 0.140.

Example 20

Three parts of ethylene diacrylate (containing 0.2% of phenyl β-napthylamine) was mixed with 2.18 parts of a 25% aqueous solution of methylamine, and 95% ethanol was added until a homogeneous solution was obtained. This solution was allowed to stand at room temperature for 7 days, after which it was heated at 90° C. for 2 days. The solvent was then removed by distillation in vacuo, whereupon the polymer was obtained in the form of a viscous, light brown oil. A 1% solution of this polymer in 2% acetic acid had a specific viscosity of 0.138.

Example 21

A solution of 1.32 parts of potassium hydroxide in 2 parts of water and 10 parts of 95% ethanol was added dropwise to an agitated mixture of 4.0 parts of ethylene diacrylate (containing 0.2% of phenyl β-naphthylamine) and 1.63 parts of hydroxylamine hydrochloride at 0° C. The reaction mixture was allowed to stand at room temperature for 2 days, after which the solvent was removed by distillation in vacuo. The residue was extracted with absolute alcohol and the alcoholic solution so obtained was evaporated to dryness. The viscous oil which remained contained 6.9% nitrogen (calculated for a 1:1 polymer 6.9%).

Example 22

A mixture of 5.0 parts of polyethylene maleate, 0.01 part of di-t-butylhydroquinone, 0.09 part of bis(2-mercaptoethyl)sulfide, and 0.5 part of pyridine was heated at 110°–120° C. Gelling of the reaction mixture started at the end of 10 minutes and it was completely gelled after 15 minutes of heating at this temperature.

Example 23

A solution of 0.05 part of sodium in 5 parts of t-butyl alcohol was added to a mixture of 1.86 parts of p-toluenesulfonamide, 1.68 parts of methylenebis(acrylamide), and 0.02 part of phenyl β-naphthylamine. The t-butyl alcohol was removed by distillation and replaced with 3 parts of quinoline. The reaction mixture was heated at 100° C. for 48 hours and then at 145° C. for 4 hours. It was cooled to room temperature and the mixture (including the precipitated product) was poured into 50 parts of ether. The precipitate was removed by filtration and extracted twice with 50 parts of 95% ethanol. The tan solid polymer so obtained was found to be soluble in hot dimethylformamide, hot ethylene glycol, m-cresol, and 90% formic acid. It contained 8.8% sulfur (calculated for a 1:1 polymer 9.9%), and a 1% solution of it in m-cresol had a specific viscosity of 0.068.

Example 24

To a mixture of 1.79 parts of phorone and 2.0 parts of bis(2-mercaptoethyl)sulfide was added 0.05 part of a 25% solution of trimethylbenzylammonium hydroxide in methanol. The vigorous exothermic reaction that ensued was moderated by cooling the reaction vessel so that the maximum temperature which was attained was 80° C. The reaction mixture was then allowed to stand overnight at 25° C. It was dissolved in 5 parts of acetone and the resultant solution was poured into 25 parts of ether, whereupon the polymer separated as a colorless, viscous oil. The supernatant liquid was decanted and the polymer dried in vacuo at 60° C. It was soluble in acetone, benzene, and dioxane and was insoluble in 95% ethanol, water, and ether. A 1% solution of the polymer in acetone had a specific viscosity of 0.08. The polymer contained 33.2% sulfur (calculated for a 1:1 polymer 32.9%).

Example 25

A mixture of 3.0 parts of dibenzylacetone, 1.97 parts of bis(2-mercaptoethyl)sulfide, and 3 parts of pyridine was agitated and heated at 100° C. until homogeneous. The solution was then cooled to room temperature and 0.05 part of a 25% solution of trimethylbenzylammonium hydroxide in methanol was added to it. The reaction mixture was allowed to stand for 3 days at 25° C., after which it was poured into 60 parts of methanol. The supernatant liquid was removed by decantation and the residue was dried in vacuo at 60° C. The rubbery solid polymer so obtained had a light straw color and was soluble in benzene and dimethylformamide and insoluble in ether, acetone, 95% ethanol, and methanol. It contained 24.6% sulfur (calculated for a 1:1 polymer 24.7%). A 1% solution of this polymer in benzene had a specific viscosity of 0.13.

In accordance with this invention, an organic compound containing at least two ethylene double bonds which are activated by the presence of a carbonyl group in the α-position to each of the double bonds may be copolymerized with any compound which contains at least two active hydrogens. As may be seen from the foregoing examples, a wide variety of polymers may be produced. These polymers may be linear or cross-linked, depending upon the monomers that are copolymerized. The copolymer may be the product derived by the copolymerization of one of the ethylenically unsaturated monomers with a single active hydrogen compound or two different types of active hydrogen compounds may be copolymerized with the activated ethylenically unsaturated compound.

Any organic compound containing two or more ethylene double bonds may be copolymerized with a compound containing two or more active hydrogens, provided that at least two of the ethylene double bonds are activated by having in the α-position to each double bond a carbonyl group, as, for example, the carbonyl group that is present in an aldehyde, ketone, acid, ester, or amide linkage. The diolefinic compound may be a diester containing an ethylene double bond in α-position to the carbonyls of each of the ester linkages, as, for example, diesters of the following general formulas:

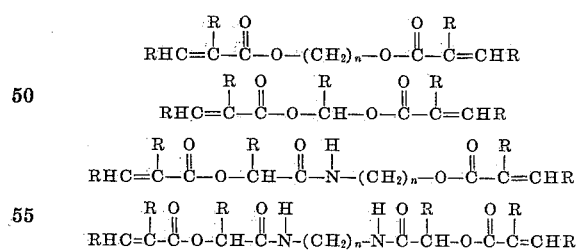

where R in each case may be hydrogen, alkyl, cycloalkyl, or aralkyl and n is an integer equal to or greater than 1, and preferably is from 2 to 4. Exemplary of such diesters are the alkylene diacrylates such as ethylene diacrylate, ethylene dimethacrylate, etc.; the alkylidene diacrylates such as ethylidene diacrylate, ethylidene dimethacrylate, etc.; and other alkylene and alkylidene diesters such as ethylene dicrotonate, etc.; glyceryl triacrylate, etc.; the N-(omega-acryloxyalkyl) α-acryloxypropionamides such as N-(β-acryloxyethyl) α-acryloxypropionamide, N-(β-methacryloxyethyl) α-methacryloxypropionamide, etc.; and the N,N'-bis(α-acryloxypropionyl)alkylenediamine, such as N,N'-bis(α-acryloxypropionyl)ethylenediamine, N,N'-bis(α-methacryloxypropionyl)ethylenediamine, etc. It may also be an unsaturated polyester as, for example, polyethylene maleate, polyvinylacrylate, etc. The diolefinic compound may be a diamide containing an ethylene double bond in α-position to the carbonyls of each of the amide linkages as, for example, diamides of the type

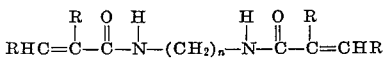

where $n$ is an integer of 1 or more and R may be hydrogen, alkyl, etc., examples of which are methylenebis(acrylamide), methylenebis(methacrylamide), methylenebis(crotonamide), etc. Another type of diolefinic compound containing activated ethylene double bonds are those wherein there is a carbonyl of a carboxylic acid group in $\alpha$-position to each of the double bonds, as, for example, dicarboxylic acids of the following general formulas:

$$HOOC-CH=CH-(CH_2)_n-CH=CH-COOH$$

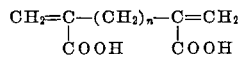

where $n$ may be zero or any integer greater than zero. Exemplary of these compounds are muconic acid and 2,3-dimethylene succinic acid. In the same way, the diolefin may be one in which the ethylene double bonds are activated by the presence of the carbonyl of a ketone group in the $\alpha$-position as, for example, ketones of the type

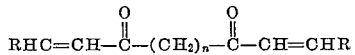

where $n$ may be any integer greater than zero and R may be hydrogen, alkyl, aryl, etc. It is also possible to use ketones wherein the ethylene double bonds are in the $\alpha$-position to the same carbonyl group, as in the case of ketones of the type

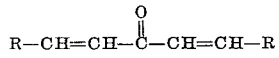

where R may be hydrogen, alkyl, aralkyl, cycloalkyl, etc. Exemplary of such ketones are 3-pentadienone, phorone, dibenzalacetone, etc. The diolefin may also be one containing aldehyde groups in the $\alpha$-position to the ethylene double bonds as, for example, a dialdehyde of the type

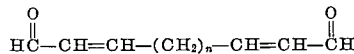

where $n$ may be zero or any integer greater than zero, an example of which is muconic aldehyde.

The active hydrogen compound which is copolymerized with the activated diethylenically unsaturated compounds in accordance with this invention must be one which contains at least two active hydrogens. As is well-known, an active hydrogen compound is any compound, organic or inorganic, wherein there is at least one hydrogen atom attached to an element other than carbon and therefore active, or if attached to carbon, the hydrogen atom is a so-called acidic hydrogen or hydrogen activated by the presence of some activating group in the $\alpha$-position to the carbon to which the active hydrogen is attached; as, for example, in the case of the hydrogens in the $\alpha$-position to the nitro group of primary and secondary nitroalkanes, the methylene hydrogens of malonic esters or acetoacetic esters, etc. Any of these active hydrogen compounds, organic or inorganic, may be used to produce the new polymeric materials of this invention provided that the compound contains at least two active hydrogen atoms. While some of the above-mentioned diolefins may contain active hydrogen in them, to produce a copolymer of such compounds, there must obviously be used a second monomer, that is, an active hydrogen compound different from the diolefin. Of particular value are those compounds containing at least two active hydrogens wherein the active hydrogen is that present in one of the groups: —NH$_2$, —NHR, —CONH$_2$, —SO$_2$NH$_2$, =N—OH, —SH, —OH, =CHNO$_2$, and —CH$_2$—CO—. Exemplary of the active hydrogen compounds containing at least two active hydrogens are those compounds containing an —NH$_2$ group as is present, for example, in ammonia, hydrazine, phenylhydrazine, hydroxylamine, urea, thiourea, and primary amines as, for example, alkyl amines such as methylamine, ethylamine, n-butylamine, amylamines, hexylamines; or unsaturated aliphatic amines such as allylamine; arylamines such as aniline; aralkylamines such as benzylamine; cycloalkylamines such as cyclohexylamine; diamines such as ethylenediamine, hexamethylenediamine, p-phenylenediamine; or aminoalcohols such as ethanolamine, etc. Secondary amines may be used as the active hydrogen compound provided that there are at least two of the secondary amino groups present in the molecule as, for example, in the case of piperazine, or there must be present one secondary amino group and some other active hydrogen-containing group in the molecule. Amides and sulfonamides may also be used as the active hydrogen compounds as, for example, p-toluenesulfonamide, etc. Since one of the hydrogens attached to the nitrogen of the amide or sulfonamide group may be considered as being more active than the second hydrogen, it is frequently desirable to use a compound containing at least two of such groups as, for example, a diamide, triamide, etc., such as the diamides of suberic, pimelic, adipic, azelaic, sebacic, and terephthalic acids, nitrilotriacetamide, nitrilotripropionamide, etc. Other active hydrogen compounds which may be used are such compounds as hydrogen sulfide and the mercaptans, which compounds contain the group —SH. In the case of the mercaptans, it is, of course, necessary that there be two mercapto groups present in order to furnish the two active hydrogens. Thus, the mercaptans which may be used are such compounds as the polymethylene dimercaptans such as ethanedithiol, 1.5-pentanedithiol, hexamethylenedithiol, and other dimercaptans such as bis(2-mercaptoethyl)sulfide, dithioresorcinol, etc. Exemplary of the compounds containing active hydrogen in the form of an —OH group are the glycols such as ethylene glycol, propylene glycol, butylene glycol, etc.; glycerol; diphenols such as biphenol, p,p'-isopropylidenediphenol, which is commonly called Bisphenol A; dihydric phenols as, for example, resorcinol; hydroxylamine; aminoalcohols as, for example, ethanolamine; dioximes, etc. As mentioned above, primary and secondary nitroalkanes having hydrogen in the $\alpha$-position to the nitro group may be used as, for example, nitromethane, nitroethane, etc. Ketones, ketoacids, and other compounds having two hydrogens in the $\alpha$-position to a carbonyl group may be used as, for example, acetylacetone, acetonylacetone, diacetylacetone, acetophenone, malonic esters such as methyl malonate, ethyl malonate, etc., acetoacetic esters such as ethyl acetoacetate, etc., cyanoacetic esters such as ethyl cyanoacetate, etc. The active hydrogen compound may also be one wherein there are present two or more different types of active hydrogen groups as, for example, ethanolamine, 2-mercaptoethylamine, aminothiophenol, etc. Obviously, many other active hydrogen compounds, wherein there are present in the molecule at least two active hydrogens, may be used in the preparation of the copolymers of this invention.

Any ratio of the two monomers may be used to prepare the new polymers of this invention. Frequently a 1:1 monomer ratio is used but, as may be seen from Examples 9 and 10, polymers of varying ratios of the monomers may be produced. In general, the mole ratio of the ethylenically unsaturated monomer to the active hydrogen monomer will vary from about 0.75 to about 2.0 and preferably will be within the range of about 0.75 to about 1.25.

The copolymerization reaction, in accordance with this invention, is carried out in the presence of a basic catalyst. As pointed out above, when the active hydrogen compound is itself basic in character, as in the case of the ammonia used in Example 8 and the amines used in Examples 1–3, 6, 7, 9 and 10, it is not necessary to add a second basic material, the active hydrogen compound in this case acting as the basic catalyst. However, when the active hydrogen compound is not basic as in the case of the glycols, mercaptans, etc., it is necessary to add a basic catalyst in order to bring about the copolymerization reaction. Any basic material may be added to catalyze this copolymerization reaction. Exemplary of suitable basic catalysts which may be used are the alkali metals such as sodium or potassium; the alkali metal hydroxides such as sodium and potassium hydroxide; quaternary ammonium hydroxides such as trimethylbenzyl-, triethylbenzyl-, dimethyldibenzyl-, diethyldibenzyl-ammonium hydroxides, etc.; alkali metal alcoholates such as sodium and potassium methoxide, ethoxide, butoxide, phenoxide, etc.; alkali metal amides such as sodamide, etc.; sodium triphenylmethyl, etc.

The copolymerization of the activated ethylenically unsaturated compound and the active hydrogen compound may be carried out under a wide variety of conditions. In general, it is carried out at a temperature within the range of about 0° C. to about 170° C., and preferably from about 25° C. to about 110° C. Lower temperatures can be used in some instances as can higher temperatures, depending upon the activity of the components. However, if the ethylenically unsaturated compound is one which tends to undergo thermal self-polymerization, such higher temperatures should be avoided. The time required for the reaction will, of course, vary with the activity of the monomers, temperature, etc. The polymerization may be an instantaneous reaction or one requiring from several hours up to several days to obtain a maximum molecular weight.

As may be seen from the examples, the reaction may be carried out in the absence or presence of a diluent. In general, higher molecular weight polymers are obtained when the monomers are mixed without the aid of a solvent. However, in some instances it may be desirable to moderate the initial exothermic reaction by means of a solvent, or a solvent may be required to more readily obtain an intimate mixture of the monomers. Any organic liquid which is inert under the polymerization conditions may be used as a diluent for the reaction or a large excess of one of the monomers may be used to function as a diluent. Suitable inert solvents which may be used are alcohols such as tert-butyl alcohol, isopropanol, ethanol, dimethylformamide, dioxane, pyridine, quinoline, N,N-diethylacetamide, benzene, toluene, etc., and in some special cases, water.

Another variation in the reaction conditions which is frequently desirable is the addition of an inhibitor for the self-polymerization of the ethylenically unsaturated compound. Many of the latter compounds have a strong tendency to form a homopolymer and by adding a polymerization inhibitor such as hydroquinone or phenyl β-naphthalamine, the self-polymerization reaction is avoided and the copolymerization reaction then takes place. The amount of such inhibitor which is added, if any, is, of course, such an amount as will inhibit the self-polymerization without completely inhibiting any polymerization. Usually an amount of about 0.1 to 0.2% of the inhibitor is sufficient.

The new polymeric materials of this invention have a wide variety of properties and, hence, are useful in a wide variety of applications, depending upon the type of polymer produced. As has already been stated, linear polymers are produced when the ethylenically unsaturated compound contains two terminal ethylene double bonds and the active hydrogen compound is difunctional. Thus, linear polyamines are obtained by the copolymerization of alkylene diacrylates and primary monoamines. Such linear polymers may be soluble and, hence, may be used for paper coating adhesives or for the modification of urea-formaldehyde resins. For example, an ethylene diacrylate—ethanolamine copolymer is an excellent modifier for urea-formaldehyde resins used in wet-strength paper applications. Where the active hydrogen compound is a tri- or tetra-functional compound, the polymer is cross-linked. Such polymers are useful for the production of tough, insoluble films for surface coatings. The invention is also useful in the production of larger polymers from smaller polymers. For example, an unsaturated polyester, such as polyethylene maleate can be mixed with an active hydrogen compound, spread into a film, and heated to insolubilize the film by cross-linking.

What I claim and desire to protect by Letters Patent is:

1. A polymeric addition product of an alkylenebis-(acrylamide) and piperazine.
2. A polymeric addition product of methylenebis(acrylamide) and piperazine.

References Cited in the file of this patent

UNITED STATES PATENTS

| | | |
|---|---|---|
| 2,129,722 | Woodhouse | Sept. 13, 1938 |
| 2,146,210 | Graves | Feb. 7, 1939 |
| 2,173,005 | Strain | Sept. 12, 1939 |
| 2,317,130 | Coes et al. | Apr. 20, 1943 |
| 2,340,110 | D'Alelio | Jan. 25, 1944 |
| 2,452,669 | Levine | Nov. 2, 1948 |
| 2,475,846 | Lundberg | July 12, 1949 |
| 2,493,364 | Schoene | Jan. 3, 1950 |
| 2,527,300 | Dudley | Oct. 24, 1950 |
| 2,537,689 | Mowry et al. | Jan. 9, 1951 |
| 2,576,502 | Dalton | Nov. 27, 1951 |
| 2,598,663 | Kropa | June 3, 1952 |
| 2,627,512 | Zerner et al. | Feb. 3, 1953 |
| 2,643,958 | Kleiner et al. | June 30, 1953 |